July 4, 1961  K. GEBELE ET AL  2,990,761
PHOTOGRAPHIC CAMERA ADJUSTING MEANS
Filed Jan. 8, 1958  7 Sheets-Sheet 6

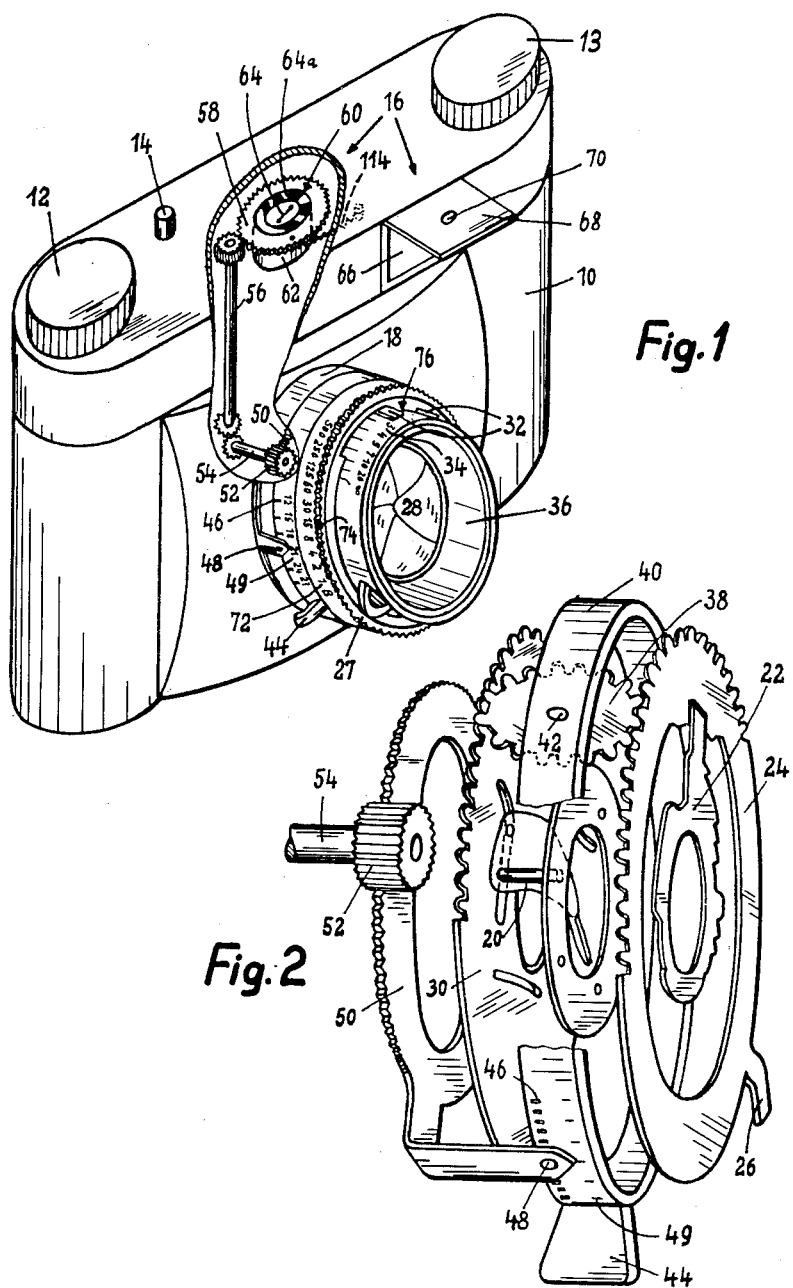

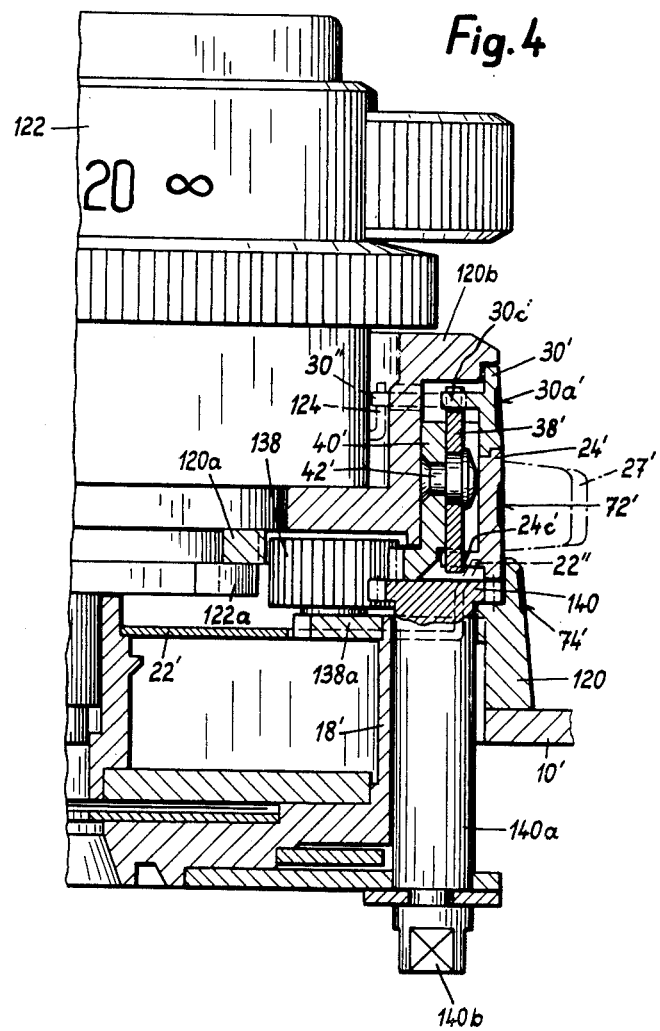

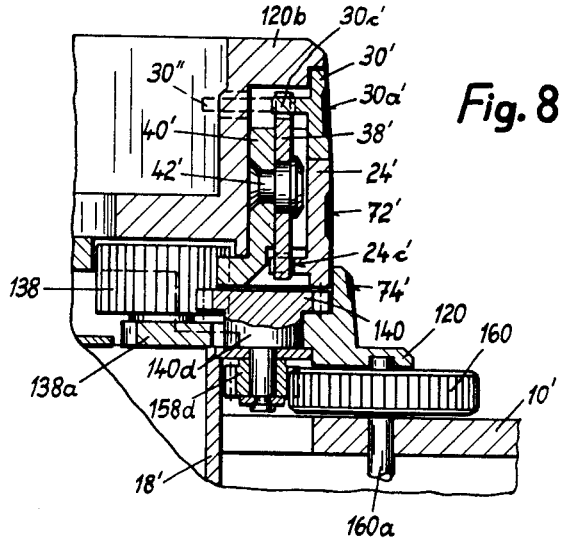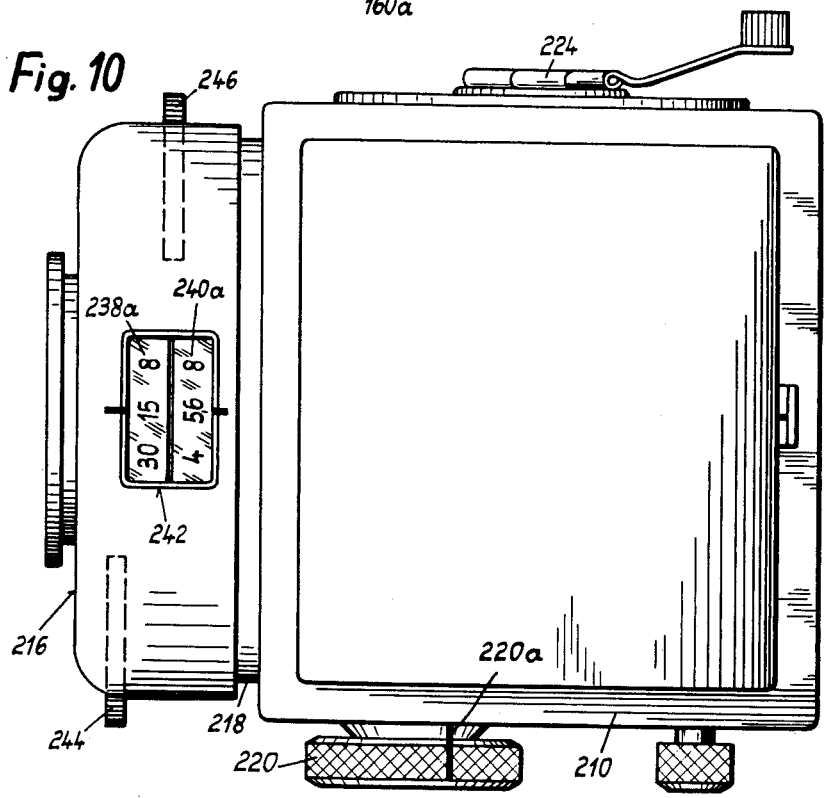

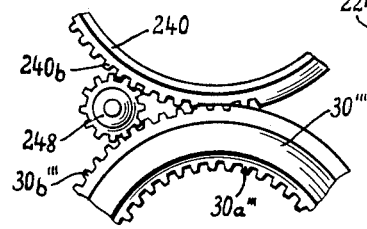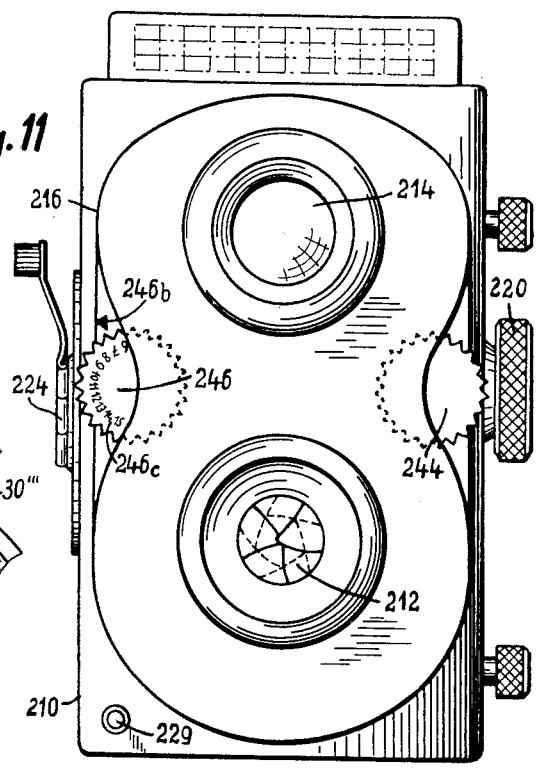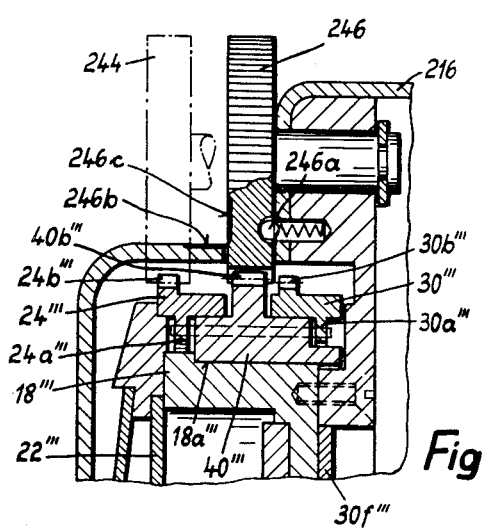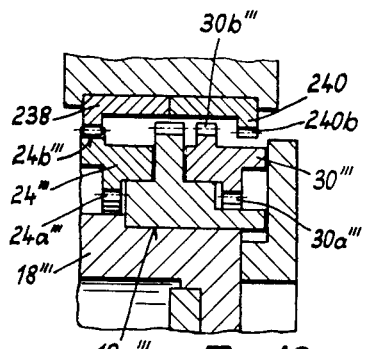

United States Patent Office 2,990,761
Patented July 4, 1961

2,990,761
PHOTOGRAPHIC CAMERA ADJUSTING MEANS

Kurt Gebele and Franz Singer, Munich, Germany, assignors, by mesne assignments, to Compur-Werk Friedrich Deckel O.H.G., Munich, Germany, a firm of Germany
Filed Jan. 8, 1958, Ser. No. 707,796
Claims priority, application Germany Jan. 12, 1957
5 Claims. (Cl. 95—64)

This invention relates to means for setting certain adjustable parts of a photographic camera, particularly the adjustable control for the shutter speed or time of exposure, and the control for the diaphragm aperture.

An object of the invention is the provision of generally improved and more satisfactory means of this kind.

Another object is the provision of improved control means including a simple, inexpensive, and sturdy form of differential gearing enabling the adjustment of shutter speed to effect a compensating or complementary adjustment of diaphragm aperture, or vice versa, and also enabling quick and easy adjustment of the relative values of shutter speed and diaphragm aperture in accordance with light value or exposure value.

Still another object is the provision of control means embodying differential gearing and so designed and constructed as to be particularly suitable for modern compact or "miniature" cameras.

A further object is the provision of control means of simplified form, easy for a beginner or amateur photographer to use.

These and other desirable objects may be attained in the manner disclosed as an illustrative embodiment of the invention in the following description and in the accompanying drawings forming a part hereof, in which:

FIG. 1 is a somewhat diagrammatic perspective view, with parts broken away and parts omitted, showing a photographic camera in accordance with one embodiment of the present invention;

FIG. 2 is a perspective view, somewhat exploded and on a larger scale, of the differential gear system employed in the camera shown in FIG. 1;

FIG. 4 is a fragmentary view of part of the camera shown in FIG. 3, on a larger scale, with parts omitted and parts in horizontal section, the section being taken in part approximately on the line 4—4 of FIG. 6;

FIG. 8 is a fragmentary section showing another modification;

FIG. 10 is a top plan view of the same;

FIG. 11 is a front elevation of the same;

FIG. 12 is a vertical section through part of the mechanism illustrated in FIGS. 9–11, showing additional details;

FIG. 13 is a section illustrating further details of the camera shown in FIGS. 9–11; and FIG. 14 is a front elevation of certain parts of the camera of FIGS. 9–11, with overlying parts omitted.

The same reference numerals throughout the several views indicate the same parts.

Figure 3:
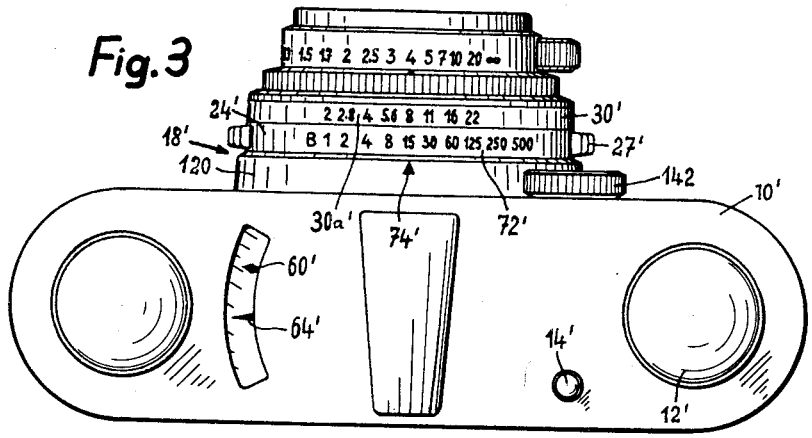
FIG. 3 is a plan of a camera in accordance with a second embodiment of the invention.

Referring now to the first embodiment of the invention as illustrated basically in FIGS. 1 and 2, there is a camera body 10 which may be the body of a camera which, except as otherwise disclosed, may be any conventional camera of a compact or "miniature" type adapted, for example, to make exposures on 35 millimeter film, and equipped with an objective shutter. The camera is equipped with a conventional film winding knob 12, and with another knob 13 for winding film back into a cassette or cartridge when all of the exposures have been made. As usual, the winding of the film by operation of the knob 12 serves also to set or cock or tension the objective shutter, ready for the next exposure, which exposure is made by depressing the shutter release plunger 14 mounted on the camera body and operatively connected to the shutter trigger in any conventional manner. The camera has a built in photoelectric exposure meter 16.

The front wall of the camera either directly or through intermediate members movable for focusing, carries the objective shutter, the housing or casing of which is indicated in general at 18. The shutter contains the usual iris diaphragm leaves 20 (see FIG. 2) and the movable shutter blades 28. The shutter speed (duration of exposure) is adjusted by turning a speed control ring 22 rotatable about the optical axis of the shutter and camera as a center of rotation, this ring 22 containing cam surfaces which cooperate with a clockwork escapement or other suitable retarding mechanism to determine the duration of exposure in well known manner. For example, the ring 22 may correspond to the shutter speed control ring 63 in Deckel and Geiger Patent 1,687,123, granted October 9, 1928. Except for the manner in which the shutter speed and the diaphragm aperture are adjusted, the rest of the shutter may also correspond in general, if desired, to this Deckel and Geiger patent, although many other known types of shutter can be used equally well. The present invention is directed to the means for adjusting and controlling the shutter speed and diaphragm aperture, rather than to the internal mechanism of the shutter, which may accordingly take many different forms known per se.

Alternatively, the shutter (except for the manner in which the diaphragm aperture and shutter speed are controlled, as further disclosed below) may be in either of the forms shown in the copending patent applications of Kurt Gebele, Serial No. 514,218, filed June 9, 1955, issued on August 25, 1959, as Patent 2,900,885 and Serial No. 520,875, filed July 8, 1955, issued on August 25 1959, as Patent 2,900,886. Both of these applications disclose shutters which can be set or cocked or tensioned by rotation of a film winding member such as the winding knob 12 of the present application and which can be released or triggered for making an exposure by depressing a "body release" plunger like the plunger 14 of the present invention.

According to the present invention, the shutter speed control ring or cam ring 22 is coupled for rotation with a coaxially rotatable ring 24 which, in turn, is provided with an externally accessible manual setting arm 26 or is coupled to an externally accessible setting ring 27 (FIG. 1) which engages the arm 26 (FIG. 2) so that any rotary movement of the external ring 27 produces corresponding rotation of the ring 24 which, in turn, produces corresponding rotation of the cam control ring 22. The shutter blades 28 are driven by known mechanism (e.g., the blade driving mechanism disclosed in said Deckel and Geiger patent or in either of said copending applications) to make an exposure of the speed or duration determined by the setting of the cam member 22.

Any one of the three shutter speed setting members 22, 24, and 27 may be provided with a detent of known form (sometimes referred to as a click stop) to retain the setting members frictionally but releasably in any one of the time scale positions or settings in which they may be set. Conveniently the detent means may be a spring member or a spring pressed ball engaging in any one of a series of notches of the rotary member, and conveniently there is one such notch for each of the shutter speed scale settings.

The iris diaphragm mechanism is likewise of conventional construction, comprising a series of diaphragm leaves or segments 20, only one of which is shown in FIG. 2, in order to simplify the drawing. They are adjusted to various aperture settings by means of the rotatable diaphragm aperture adjusting or setting ring 30, rotatable about the optical axis, concentrically with the members 22, 24, and 27. The members 22, 24, and 30 are all mounted within and are enclosed or encompassed by the shutter housing or casing 18. The speed control members 22, 24 are connected, as above explained, to the external and manually accessible speed control ring 27, but according to the present invention the diaphragm aperture setting or control ring 30 is not directly connected to any externally accessible member. Preferably the diaphragm aperture cannot be directly set by hand, according to the present invention, but can be set preferably as a function of the desired depth of field. To this end, the diaphragm setting or adjusting ring 30 is coupled with a depth of field indicator comprising two movable pointers 32 (FIG. 1) which, in known manner, rotate about the optical axis as a center, sweeping over the focusing scale 34 which is graduated in suitable units of distance. The scale may be graduated, for example, in terms of feet or in terms of meters or other suitable units, the scale shown in FIG. 1 being graduated in meters.

For the sake of greater simplicity of the present application, the details of the transmission means or driving means between the diaphragm aperture adjusting ring 30 and the depth of field indicating pointers 32 are not shown in the present application, but such transmission means may be constructed, for example, in the manner disclosed in the copending applications of Franz Singer, Serial No. 555,964, filed December 28, 1955 (now Patent 2,926,588, granted March 1, 1960) or Kurt Gebele, Serial No. 562,346, filed January 30, 1956 (now Patent 2,949,835, granted August 23, 1960), or Franz Singer, Serial No. 562,872, filed February 1, 1956, now abandoned.

The two rings 24 and 30, which serve to adjust the shutter speed and diaphragm aperture, respectively, may be considered as the setting elements proper. The internal mechanism of the speed control and diaphragm aperture control is so contrived (as well understood in the art, and within the skill of those familiar with this field) that when the two rings 24 and 30 are moved in opposite rotational directions through equal angles, the shutter speed will be varied by the same factor by which the diaphragm aperture is varied, in a compensating or complementary direction, so that the actual value of the exposure on the film is not changed (if the adjustment is made within the limits to which the familiar reciprocity law applies, of course). Hence a pre-set exposure value will not be changed by simultaneous rotation in opposite directions of the two rings 24 and 30 through the same angles. However, if one of the rings is moved without movement of the other, or if both of them are moved otherwise than through equal angles in opposite directions, then such movement will cause a variation or readjustment of the exposure value.

For purposes of this discussion, the exposure value (sometimes called the light value, or the integrated exposure value, or the overall or total exposure value) may be regarded as a number indicated by a photoelectric exposure meter which already makes allowance for the light value or illumination value of the object to be photographed, or a number correspondingly estimated by the photographer on the basis of his experience, and whether it is shown by a meter or obtained by estimation, it may in either event make allowance for film speed and filter factor, although these need not be necessarily included in the meter setting or adjustment, but can be separately allowed for or can be taken into account by a separate or additional control element located directly on the shutter assembly or unit. The use of an exposure value as an aid in setting shutter speed and diaphragm aperture is fully explained in the copending patent application of Kurt Gebele, Serial No. 389,775, filed November 2, 1953, now Patent No. 2,829,574, issued April 8, 1958.

According to the present invention, the two setting elements or rings 24 and 30 are preferably coaxially arranged, are of equal diameter, and have gear teeth of equal size and pitch on their respective peripheries or the necessary angular portions thereof. A gear 38 has teeth which mesh with the teeth on both of the gears 24 and 30, as well seen in FIG. 2. The gear 38 may be regarded as a planet gear, and the gears 24 and 30 may be regarded as sun gears on which the planet gear rotates. The planet gear 38 rotates on an axis perpendicular to the optical axis on which the gears 24 and 30 rotates, and rotate in a plane tangential, in effect, to the optical axis. If the gears 24 and 30 are of any great thickness in an axial direction, then the gear teeth thereon are of bevel gear form, and the planet gear 38 is a bevel gear meshing therewith. In most cases, however, the gears 24 and 30 may satisfactorily be made as stampings from sheet metal, and are sufficiently thin and have sufficiently coarse teeth so that they need not be of bevel form but may mesh satisfactorily with ordinary spur teeth of a thin sheet metal planet gear 38, thus enabling the parts to be constructed relatively inexpensively. The parts 24, 30, and 38 collectively constitute a differential gearing which serves to couple the shutter speed control to the diaphragm aperture control.

The planet gear 38 is mounted on a ring shaped setting wheel 40 which encircles the shutter housing or casing 18 exteriorly thereof and is held in a groove or guideway on the outer face of the shutter casing so as to be restrained against axial movement, while rotatable on the shutter housing. Since the two rings or gears 24 and 30 are enclosed within the housing, while the member 40 encircles the outside of the housing, it follows that the circumferential wall of the housing, beneath the ring 40, is provided with a circumferential slot or groove to accommodate the pivot pin 42 which extends radially inwardly from the ring 40 and serves as the pivot for the gear 38. This circumferential slot in the housing is of sufficient circumferential extent to allow for all necessary rotational movement of the ring 40, which need not rotate through a complete revolution but only through a fraction thereof.

The ring 40 is equipped with a grip portion 44 (FIGS. 1 and 2) conveniently projecting outwardly in a generally radial direction, which may be easily grasped by the fingers of the user, so as to turn the ring 40 relative to the stationary casing or housing 18 of the shutter unit or assembly. Conveniently the ring 40 may be freely rotatable (through its limited range) but secured against inadvertent rotation from any position in which it happens to be set, either by friction, or by a suitable resilient or frictional detent. The friction or detent must be sufficient to retain the ring 40 in position, without rotation, when either one of the rings 24 and 30 is turned, thus forcing the gear 38 to rotate so as to turn the other one of the rings 24 and 30 without causing rotation of the ring 40. In other words, the friction tending to maintain the ring 40 in position is sufficiently great so that, unless forcibly displaced, the axis or pivot 42 of the gear 38 will remain stationary, and any rotary motion transmitted to either of the rings 24 and 30 will, by rotation of the gear 38 on its own stationary axis, serve to rotate the other one of such gears 24 and 30.

The ring 40 (which may also be referred to as a setting wheel) is provided on its periphery with a series of notches 46 engaged by a spring catch or resilient detent 48 secured to a ring 50 which is rotatable about the optical axis, coaxially with the previously mentioned rings 22, 24, 30, and 40. The member 48 is resiliently pressed radially inwardly into one or another of the notches 46, so as to constitute a coupling to cause the members 50 and 40 to rotate together as a unit, except when the resilient tongue or coupling member 48 is displaced radially outwardly from one of the notches 46 in order to move it to engagement with another of the notches 46. A film speed scale 49 (FIG. 1) is marked on the ring 40 adjacent the notches 46, to indicate the particular notch in which the coupling tongue or resilient member 48 should be seated for any particular film speed.

The ring 50 (which may be referred to as an entraining ring) is provided on part of its periphery with gear teeth which mesh with the teeth of a pinion 52 on a shaft 54 extending parallel to the optical axis and having at its rear end a bevel gear meshing with a bevel gear on the lower end of a vertical shaft 56 rotatably mounted in a stationary part of the camera body. The shaft 56 at its upper end carries a pinion meshing with gear teeth on a horizontally arranged follow-up ring 58 rotatably mounted within the camera body near the horizontal top wall thereof, the gear 58 being provided with a reference point or index mark 60 which may be observed by looking downwardly through a window in the top wall of the camera located directly over the gear 58.

The follow-up ring 58 encircles the indicating head 62 and pointer 64 of a photoelectric exposure meter. The narrow top wall of the camera contains the transparent viewing window above mentioned, through which both the index mark 60 and the pointer 64 can be observed. A photocell 66 is built into the front wall of the camera and, in the usual way, supplies the current for energizing the meter and controlling the position of the pointer 64, which pointer is preferably connected, as usual, to a moving coil galvanometer whose circuit includes the photocell 66. The electric connections are well known and require no further detailed description. In order to adapt the light meter to two different ranges of illumination, there may be a light flap 68 hinged to the front wall of the camera, and containing a relatively small aperture 70. When the flap is open in the position shown in FIG. 1, the photocell receives light throughout its entire area, and is thus in its more sensitive range, for use with relatively dim light. When the flap 68 is dropped downwardly, it covers the area of the photocell except the part behind the small aperture 70, so that the meter is now in its less sensitive range, for use with brighter illumination. To adapt the indicating part of the meter to the two ranges, the entire indicating head 62 and pointer 64 may be reset to one position or another in a known manner.

The scale arrangement for use with this embodiment of the invention is preferably in the form shown in FIG. 1. The shutter speed scale is indicated at 72, and is located on a circumferentially extending fixed part of the shutter housing, forwardly of the ring 40 and rearwardly of the shutter speed setting ring 27. It is read in conjunction with an index mark or reference point 74 located on the ring 27. The focusing distance scale 34 is arranged circumferentially on the periphery of a movable lens mount, rotated for focusing, and cooperates with a fixed mark 76 on a stationary part of the housing or casing. The pointers 32 of the depth of field indicator moves symmetrically toward and away from each other, over the focusing distance scale 34, under the control of the diaphragm aperture setting mechanism, as already indicated.

In the illustrated embodiment, the exposure meter merely registers the illumination or lighting conditions of the object to be photographed, without any meter adjustment for film speed or filter factor, although such adjustments could be built into the meter, of course. But in the simplified form here shown, the film speed adjustment is accomplished by moving the coupling tongue 48 to a different position in a different one of the coupling notches 46 associated with the film speed scale. No specific allowance is here made for filter factor, as most photographs are made without filter. But if a filter is used, the filter factor can be allowed for by making appropriate movement of the coupling tongue 48 with reference to the film speed scale, as will be understood by those skilled in this field. For example, if one is using a filter having a filter factor of 2, the exposure must be doubled for other conditions being equal, which would be the same thing as replacing the film actually used with a film having a speed rating half as great. Thus the tongue 48 can be moved on the scale 49 to a slower indicated film speed, in order to make allowance for filter factor, if necessary.

The operation of this first form of the invention will probably be obvious from the above description, but it may be recapitulated as follows: First the coupling parts 46, 48 are adjusted to set the camera for the film speed or film sensitivity of the particular film being used in the camera, also making allowance, if desired, for filter factor.

The camera is then pointed toward the object or scene to be photographed, whereupon the pointer or needle 64 of the indicating head 62 of the light meter will show a deflection according to the illumination of the object in question. The operator then rotates the setting wheel 40 by manipulation of the grip member 44, until the follow-up index mark or pointer 60 of the light meter is in alinement with the deflection of the pointer or needle 64. This rotation of the setting wheel or ring 40 serves to adjust either shutter speed or diaphragm aperture or both, to the indication of the exposure meter. As soon as the pointers 60 and 64 are brought into registry or alinement with each other, the camera has been set to the desired exposure value that has been measured by the light meter.

Ordinarily, the rotation of the setting ring 40 will serve to change the diaphragm aperture but will leave the shutter speed set at whatever position it was set previously. This is because the shutter speed setting parts 22, 24 offer greater resistance to rotation than the diaphragm aperture setting part 30, due to the above mentioned resilient detent which is preferably engaged with one of the parts 22, 24 to tend to hold it resiliently in any position in which it is set, or due to a releasable brake or latch which may be provided, to hold the shutter speed setting parts immovably in any given set position until the brake or latch is positively released. However, if the rotation of the setting ring 40 brings the diaphragm aperture setting member 30 to the extreme limit of its possible movement, then further rotational force applied to the ring 40 will, of course, result in turning the shutter speed setting parts 22, 24 by overcoming the resistance of the resilient detent, if a resilient or frictional brake is employed on these parts. The added resistance will be manually felt by the operator during his manipulation of the ring 40, thus warning him that the shutter speed has been changed from its previous setting. Of course if a positive brake or latch is used for the shutter setting parts rather than a resilient or frictional one, the operator will feel the stoppage of the ring 40 (when the diaphragm aperture member 30 reaches the limit of its motion) and thus will be warned that he must release the brake or latch in order to permit the shutter speed setting parts to turn so that the setting ring 40 can complete its necessary movement to bring the reference mark 60 opposite the indication of the light meter pointer 64. In the usual setting operation, when the diaphragm aperture setting member 30 is still free to rotate in either direction and has not reached one end or limit of its motion, the shutter speed setting member 24 will remain stationary, and the planet gear 38 will roll on the stationary gear teeth of the member 24, thus serving to turn the diaphragm aperture setting member 30 in the same direction as the turning of the setting ring 40, but through twice the angle of movement of the ring 40. Thus the relative position of the two rings 24 and 30 is altered, to set the shutter to a new light value or exposure value, in accordance with the indication of the light meter.

At the completion of the manipulation of the ring 40 to bring the pointer 60 opposite the needle or pointer 64, the operator now has a choice of the manner in which he desires to pair the shutter speed and the diaphragm aperture settings which correspond to the exposure value that has been determined. In the illustrated embodiment of the invention he must exercise this choice by rotating the externally accessible shutter speed setting ring 27. The frictional resistance to turning the ring 40 is purposely made greater than the frictional resistance to turning the diaphragm aperture setting ring 30, so that when the shutter speed setting ring 27 is grasped and turned, the ring 40 will remain unchanged and the planet gear 38 will rotate on a stationary axis 42, to rotate the diaphragm aperture setting ring 30 through an equal angle and opposite direction relative to the rotation of the speed setting member 27 (unless, of course, the diaphragm aperture member 30 has reached the end of its range of travel).

The manner in which the photographer will exercise this choice depends, of course, on the factors which are controlling in taking the photograph. If he wishes to photograph a rapidly moving object, the controlling factor will be the speed or duration of exposure, rather than the depth of field; consequently, he will turn the shutter speed control ring 27 to produce an exposure of the necessary speed, letting the depth of field and the diaphragm aperture come wherever they may. On the other hand, if the scene contains no fast moving objects, but critical focusing is desired, then the shutter speed control ring 27 will be turned until the depth of field, as indicated by the pointers 32, is of the required extent, letting the shutter speed come where it may. If neither shutter speed nor depth of field is critical or important in the particular photograph being taken, then it is not necessary for the operator to move the shutter speed setting ring 27 at all, and he can leave it wherever it happens to be, using whatever shutter speed and diaphragm aperture happen to be set, with complete assurance that the combined shutter speed and diaphragm aperture settings, whatever they are, are correct for the prevailing light conditions, so long as the index mark 60 is opposite the light meter pointer 64, and so long as the coupling 46, 48 correctly represents the film speed or film sensitivity. In any event, whether exposure speed is important, or depth of field is important, or whether neither one of them is important, the photographer may make all necessary manipulations without paying any attention whatever to diaphragm aperture as an absolute quantity, because for practical purposes diaphragm aperture size is meaningless except as translated into depth of field, and the depth of field indications are adequately given by the pointers 32 sweeping over the focus distance scale 34. Of course the operator turns the lens mount 36 as may be necessary in order to focus on the desired object, in addition to manipulating the control ring 40 by means of the finger piece 44.

The advantages offered by a camera constructed in the manner disclosed by this first embodiment are many, some of which have already been mentioned. One of the principal advantages is that the coaxial arrangement of the differential gearing with relation to the optical axis has the advantage that the connections to or with the various setting elements can be very short, because the differential gearing assembly practically encircles or surrounds the associated internal mechanisms which control the shutter speed and the diaphragm aperture. Because of the shortness of the connections, the connecting parts are more simple, sturdy, and lighter, and are subject to less deflection, looseness, and blacklash. The number of parts is reduced to a minimum, since the setting elements which carry the scales as well as the manually operable element also constitute elements of the differential gearing system. The planet wheel 38 is in a very advantageous location with its flat side facing the periphery of the shutter housing, or in other words, the plane of the planet wheel is parallel to the optical axis and is constantly tangential to an imaginary cylinder encircling and concentric with the optical axis. In its location between the teeth of the two sun wheels or sun gear rings 24 and 30, the spatial requirements of the planet gear are extremely small and the entire differential gearing assembly may be incorporated without any increase or with practically no increase in the diameter of the shutter housing or casing. Despite the space-saving disposition, the elements of the differential mechanism may nevertheless be of very robust or sturdy construction, which contributes materially toward increasing the mechanical rigidity of the gearing and the precision with which it can be adjusted.

Furthermore, this embodiment of the invention permits the camera to be adjusted reliably and semi-automatically with a minimum of manipulations, by adjusting means of the utmost simplicity and utmost ease of use by the photographer, whether experienced or a beginner. The mechanism is of great simplicity, requiring few additional parts as compared with the conventional shutter constructions previously employed. Moreover, adjustment of the camera with reference to exposure values is continuous; that is, the exposure value can be adjusted continuously through infinitesimal increments since the diaphragm aperture is continuously variable through infinitesmal increments without having to be set at predetermined stops or numerical values. The shutter speed adjustment may also be settable continuously through infinitesimal increments throughout at least part of its range, but whether or not this is the case, in either event even in those situations where shutter speed is adjustable only in steps rather than continuously, the continuous adjustability of the diaphragm aperture enables the setting or controlling ring 40 to be adjusted by infinitesimal increments, anywhere in its range, so long as the limits of movement of the diaphragm aperture are not reached. Even when the limits of movement are reached, further movement of the ring 40 may take place upon movement of the speed setting member 24, first releasing the brake or latch, if necessary.

This continuous adjustability of the exposure value, by means of such simple mechanism including the manipulating ring 40, is particularly valuable in combination with the light meter of the follower type, because the needle or pointer 64 of the light meter may obviously assume any position within its range, not being limited to a series of spaced or stepped positions; therefore the follower pointer 60 should also be adjustable continuously, by infinitesimal increments, in order that it may be brought into alignment with the pointer 64, regardless of the position which the pointer may assume.

It will be understood from the foregoing that the setting of the shutter mechanism ready for making an exposure, requires the manipulation of only two setting elements, namely, the shutter speed control ring 24, 27, and the main setting wheel or ring 40, moved by its finger piece 44. In fact, in most cases, where neither depth of field nor speed of exposure is critical, the entire setting is accomplished merely by moving one member, the ring 40. It is only when either the shutter speed or the depth of field becomes important, that the operator must bother even with the second member 24, 27, and when it is necessary to move the member 27, this is done in an extremely simple manner. There is no necessity, as there is in many other cameras, for transferring the reading of a light meter mentally to the shutter mechanism, all that is required being the simple manual step of moving the handle or finger piece 44 until the index mark 60 comes opposite the pointer 64 of the light meter. Exposures can thus be made quite readily by even the most inexperienced person.

Even the arrangement for making allowance for different film speeds or film sensitivity is extremely simple, in this embodiment of the invention. It is not necessary to set any supplementary knobs on the light meter, or to make any adjustment of the light meter for this purpose, all that is needed being a simple initial setting (when the film is loaded into the camera) of the pointer 48 in the appropriate one of the notches 46 so as to bring it opposite the correct numeral of the film sensitivity scale 49. No special film speed devices, such as variable electrical resistors, are needed.

A second embodiment of the invention will now be described with reference to FIGS. 3–6. Many of the parts in this embodiment perform the same functions as parts in the first embodiment, and are indicated by the same reference numerals used in the first embodiment for the part of corresponding function, with the addition of a ('). In general, such parts need little or no specific description, and it will be understood that those parts in FIGS. 3–6 which are not specifically described perform the same function as the correspondingly numbered parts in the first embodiment, and are in general constructed the same as the corresponding parts in the first embodiment except as otherwise herein mentioned, with possibly some changes in size or location which will be obvious to those skilled in this field without the need for any special description beyond what is given below.

In this second embodiment, the invention is applied to a camera having an objective shutter and an interchangeable lens or objective, the shutter itself being permanently mounted on the camera body while the interchangeable objective is attachable to and detachable from the camera by means of a bayonet joint or the like, the iris diaphragm being carried in this instance by the interchangeable objective unit rather than by the main shutter unit.

Referring now to Figs. 3–6, the camera 10' is equipped with the shutter assembly indicated in general at 18', the shutter being fitted within a mounting ring or bayonet adapter ring 120 which is secured to the front face of the camera body 10'. The bayonet ring 120 has bayonet lug projections 120a for cooperation with mating bayonet lugs 122a at the rear of the interchangeable objective or interchangeable lens mount unit 122.

The front of the shutter assembly 18' carries the shutter speed setting ring 22' for setting the various available shutter speeds. The iris diaphragm assembly, as already mentioned above, is not included in the shutter, but is included in the interchangeable lens mount 122, in a manner known per se, and not here illustrated. Except for being mounted in the interchangeable lens unit rather than in the shutter itself, the iris diaphragm may otherwise be of the same construction as when mounted in the shutter. The rotary member in the interchangeable lens unit is not here shown, but (except for its different location, as just explained) it corresponds to the aperture adjusting ring 30 of the previous embodiment, and it has an arm 124 (Fig. 4) which engages the control mechanism for turning the ring to adjust the size of the diaphragm aperture, as further explained below.

Figure 5:
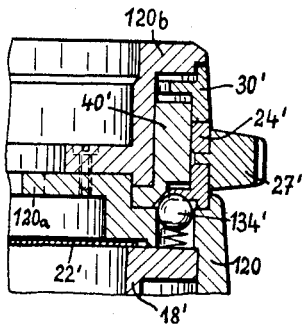
FIG. 5 is a fragmentary view of part of the construction shown in FIG. 4, taken on a different radial section.
Figure 6:
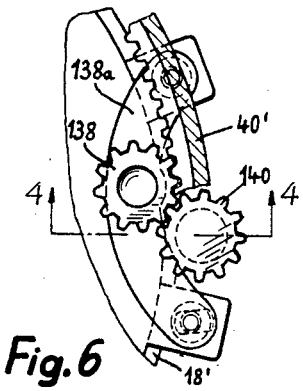
FIG. 6 is a fragmentary plan of part of the mechanism shown in FIG. 4, with overlying parts removed and parts in section.

A ring 120b of somewhat Z-shaped cross section is held to the bayonet adapter ring 120 by screws, one of which is shown in dotted lines in Fig. 5. An annular recess extends circumferentially around the outside of the ring 120b and contains the setting rings 24' and 30' which rotate around the fixed ring 120b, concentrically with the optical axis. The diaphragm control ring 30' is forwardly of the shutter speed control ring 24', and contains a portion 30" in the form of a bifurcated arm extending radially inwardly toward the optical axis and containing a slot engaged by the portion 124 on the diaphragm adjusting ring of the interchangeable lens unit, when the latter is in normal position attached to the shutter. When the interchangeable lens unit is detached, the portion 124 (staying with the lens unit, of course) slides forwardly out of the notch or slot at the inner end of the arm 30", and when the interchangeable lens unit is inserted or attached at the front of the shutter, the arm 124 slips into the slot in the arm 30", so that whenever the interchangeable unit is in normal effective position on the shutter, the diaphragm adjusting mechanism of that unit is operatively coupled by the arms 124 and 30" to the aperture control ring 30'. There is, of course, a suitable arcuate slot in the member 120b, to enable the arm 30" to pass through it and to move circumferentially through its required range.

The shutter speed setting ring 24', as already mentioned, rotates around the stationary member 120b just to the rear of the ring 30'. It is coupled to the internal shutter speed setting ring 22' by means of an extension piece 22" on the ring 22', which extends through an arcuate slot in the stationary member 120, and engages in a notch in the member 24', so that all turning motion of the ring 24' (which turns about the optical axis as a center) is transmitted to the shutter speed control member 22'.

Each of the setting elements or rings 24' and 30' has an inwardly extending radial flange provided with gear teeth 24c', 30c', respectively, the internal teeth being provided either around the entire internal circumference of each radial flange, or only on a limited segment thereof, as desired. A planet wheel 38' has gear teeth meshing with the teeth 24c' and 30c' of both setting elements. This planet gear 38' rotates on a pivot pin 42' which, as in the previous embodiment, is mounted on a setting wheel or ring 40'. As before, the plane of rotation of the planet gear 38' is parallel to the optical axis and is, in all positions, tangent to an imaginary cylinder surrounding and coaxial with the optical axis. However, in this embodiment the planet wheel or gear is inside the rings 24' and 30', meshing with internal gear teeth on these rings, instead of being outside the rings and meshing with external gear teeth thereon, as was the case in the first embodiment.

In this second embodiment, the control ring 40' which carries the planet gear is enclosed within the rings 30' and 24', and is not externally accessible so cannot be directly adjusted by hand. Therefore, according to the present embodiment, the adjustment of the control ring 40', to set the camera for the desired exposure value, is accomplished through gear teeth formed internally on a toothed flange at the rear edge of the ring 40', which gear teeth mesh with the forward end of a wide pinion 138 rotatably mounted in a fixed pivot on a strap 138a movably secured by screws to two lugs or ears on the shutter housing 18', so as to permit adjustment for taking up the backlash. The rear portion of the same pinion 138 meshes with a pinion 140 at the forward end of a shaft 140a mounted in the camera body itself for rotation about an axis parallel to the optical axis. The rear end of this shaft 140a is provided with flat surfaces 140b for coupling the rear end of this shaft to further shafting and gearing of conventional kind which need not be specifically shown or described, leading to a control knob 142 mounted on the front wall of the camera body and a follow-up pointer 60' mounted just under the top wall of the camera body adjacent the pointer or needle 64' of a light meter, both the light meter pointer and the follow-up pointer 60' being observable through a window in the top wall of the camera body, as shown particularly in Fig. 3.

At one or more points on its circumference, the shutter speed control ring 24' is provided with a radially projecting finger piece 27' for easy manipulation to turn the ring to set the desired shutter speed. The ring is resiliently held in any position in which it is set, by any suitable means as described in the first embodiment, such for example as the wall 134' (Fig. 5) spring pressed to engage resiliently in any one of a series of notches or depressions in the ring 24' when the ring is set for various different shutter speeds. By this arrangement, the resistance to turning of the ring 24' is made greater than the resistance to turning the diaphragm control ring 30', just as in the first embodiment, and for the same purposes.

The shutter speed scale 72' is marked circumferentially on the outer face of the ring 24', and is read in conjunction with a fixed reference point or index mark 74' mounted on the stationary ring 120. If no depth of field indicating pointers are used, then the diaphragm aperture scale (expressed, as usual, in terms of *f* numbers) is marked on the circumference of the diaphragm control ring 30', as shown at 30a', and is read in conjunction with the same fixed reference point 74'. But if the interchangeable lens unit is provided with depth of field indicating pointers, then the aperture scale becomes wholly unnecessary (as already explained in connection with the first embodiment) and may be entirely omitted. A portion of the interchangeable lens mount near the front thereof is rotatable about the optical axis for focusing, and is provided with a focusing distance scale as shown near the front of the unit in FIG. 3.

The operation of this form of the invention is closely similar to the operation of the first embodiment. If the camera is equipped with a built-in light meter as is preferred, the photographer simply points the camera toward the object to be photographed, so that the light meter causes a deflection of the pointer 64' in accordance with the light reaching the camera from the object to be photographed. Allowance may be made for film speed or filter factor or both, by adjusting the light meter by any known means, including, for instance, a variable resistance in the circuit of the light meter. The control knob 142 is then turned to bring the follow-up pointer 60' into alinement with the light meter pointer 64', which turning of the knob 142 at the same time serves to turn the control ring 40 which carries the planet gear 38'. Because the resistance to turning the ring 24' is greater than the resistance to turning the ring 30', the planet gear will roll on the teeth 24c' of the shutter speed control, which teeth will remain stationary at this moment, and the rolling of the planet gear will cause rotation of the diaphragm aperture control ring 30', to set the camera for the proper light value.

If the camera is not equipped with a built-in light meter, then the window through which the pointer 60' is observed will have appropriate graduations associated therewith, and an external or hand light meter may be used. In this case, the indication given by the separate light meter is observed, and then the knob 142 is turned until the follow-up pointer 60' is brought to the desired reading of the graduations or scale, corresponding to the indication given by the light meter. This will cause rotation of the ring 40' and of the sun gear 38', just as in the case of the built-in light meter.

In either event, when the manipulation of the knob 142 is completed so as to bring the follow-up pointer 60' to the desired place, the operator then has his choice of various available pairs of shutter speed settings and diaphragm aperture settings, as in the case of the first embodiment. By grasping the finger piece 27', the shutter speed setting ring 24' can be turned nothwithstanding the resistance offered by the resilient ball 134'. The turning of the shutter speed ring 24' will turn the planet gear 38' and cause corresponding turning of equal angular extent, but in opposite direction, of the diaphragm aperture control ring 30'. Thus any desired pair of values (diaphragm aperture and shutter speed) can be selected, very easily and quickly.

Figure 7:
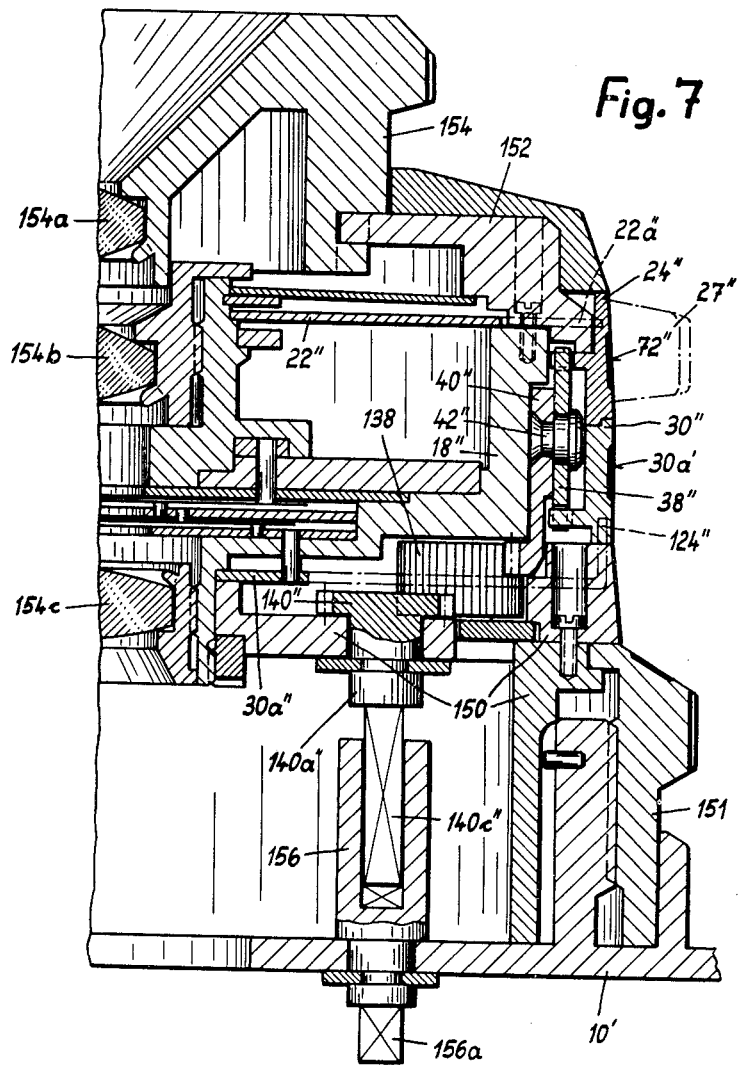
FIG. 7 is a view similar to FIG. 4, showing a modification of the construction shown in FIG. 4.

A third embodiment of the invention is illustrated in FIG. 7 and constitutes, in effect, a slight modification of the second embodiment shown in FIGS. 3–6. Many of the parts are essentially the same as in the embodiment in FIGS. 3–6, and are simply identified by the same reference numerals without the need for any further description. In this third embodiment, however, the entire shutter moves forwardly and backwardly during focusing, instead of being mounted in stationary position on the camera, and the front component of the lens is interchangeable, while the middle and rear components form a permanent part of the shutter assembly and thus are not interchangeable, but are movable axially for focusing, as a unit with the entire shutter assembly.

Therefore, the shutter housing 18" is not fixed to the camera body, but is mounted on a divided tube 150 which slides axially forwardly and backwardly on the camera body, in the direction of the optical axis, the focusing movement being produced by turning a threaded focusing ring 151 which acts as a nut on a stationary threaded ring secured to the camera body 10'. Focusing mountings of this type are well understood.

The front of the shutter housing or casing 18" carries a bayonet ring member 152 for mating bayonet engagement with a mount 154 which carries the front lens component 154a. The other or non-interchangeable lens components 154b and 154c are located in the respective front and rear lens tubes of the shutter casing 18". The shutter speed control ring 22" is coupled by means of a radial arm 22a" with the external shutter speed setting ring 24" which rotates around the outside of the shutter housing, forwardly of the diaphragm setting ring 30" which likewise rotates around the outside of the housing, both of these rings being concentric with the optical axis. The internal diaphragm aperture adjusting ring 30a" is coupled by an arm 124" which extends radially and then axially forwardly, to the ring 30" so that any turning of the latter serves to adjust the diaphragm aperture. Arcuate slots in the parts 150 and 152 are provided for the arms 22a" and 124".

As in the previous embodiment, the planet gear 38" rotates on a stub shaft or pivot 42" carried by the control ring 40" which rotates inside the two rings 24" and 30", the teeth of the planet gear engaging gear teeth formed on internal radial flanges of the rings 24" and 30". Also, as in the previous embodiment, it is seen that these three rings 24", 30", and 40" are coaxial with each other and with the optical axis, and they encircle or surround the shutter assembly.

The drive of the ring 40" is similar to that in the previous embodiment, except that provision must be made for the entire differential gearing assembly to move axially forwardly and backwardly during focusing, relative to the stationary camera body 10'. The gear teeth of the ring 40" are driven as before by the forward end of a wide pinion 138, the rear end of which pinion is driven by a second pinion 140" fixed to the forward end of a shaft 140a" which extends rearwardly, in a direction parallel to the optical axis. The rear end of this shaft is squared or of other suitable non-circular shape, as seen at 140c", and fits axially slidably or telescopically in a similar shaped socket of a sleeve 156 rotatably mounted on the camera body and having a squared rear end 156a operatively connected to the control knob 142 on the camera body and to the follow-up pointer 60' on the body. This embodiment of the invention is operated in the same way as the embodiment previously described in connection with FIGS. 3–6.

A further modification of the same general structure shown in FIGS. 3–6 is illustrated in FIG. 8. In this arrangement, the driving pinion 140 is mounted on a shaft 140d which is relatively short, instead of extending rearwardly into the camera case, and this short shaft carries at its rear end the pinion 158d which meshes with shallow teeth of a milled knob 160 mounted on a shaft 160a extending rearwardly into the camera body. This shaft 160a, like the shaft 140a in the embodiment of FIGS. 3–6, is operatively connected to the follow-up pointer 60' by connecting means of any conventional form known per se, e.g., a flexible shaft, or ordinary shafting and gearing.

The milled knob 160 is thus mounted in what may be termed a lateral bay or recess of the shutter assembly, with its outer peripheral edge projecting to an accessible position as seen in FIG. 8. The knob serves both as an adjusting wheel for manual actuation, and as a gear for turning the gear 158d and pinion 140, thus eliminating the need for the special knob 142 mounted on the camera body as shown in FIG. 3. Rotation of the projecting edge of the knob 160 by the operator's finger serves to adjust the position of the control ring 40' of the differential gearing and also move the follow-up pointer 60'.

These various embodiments thus far described require a minimum number of structural elements, and provide an extremely simple construction with little inherent backlash between the differential gearing and the manual control member on the camera body. Despite the fact that they require comparatively little space and can be constructed very compactly, the transmission can nevertheless be of very robust construction. Also, it has been pointed out above how the various setting members can be arranged either on the shutter assembly itself, or on the camera body, and in various positions on the camera body, so that it will be appreciated by those skilled in the art that the invention may be applied to many different kinds and styles of cameras, being easily adaptable to the different requirements of position and orientation which are necessitated by different styles of camera bodies. Also it will be appreciated that the diameters of the various gears can be selected with a view to providing the most convenient gear ratios in the transmission train, for a highly discriminating and accurate adjustment. All of the delicate members of the gearing and transmission mechanism are completely enclosed, thus being protected against dirt, dust, and mishandling.

The embodiments thus far described are intended particularly for a single lens camera having an objective shutter, but of course can be adapted, without departing from the basic principles of the invention, to cameras of other kinds, as for example cameras having a focal plane shutter. An embodiment of the invention particularly designed for a twin lens reflex camera of conventional construction will now be described with reference to FIGS. 9–14.

The body of a twin lens camera of any conventional kind is indicated in general at 210. The camera includes a photographic objective 212, and above it the view finder lens or objective 214, both held in the mount or focusing front member 216 mounted on a guide flange 218 fixed to the front wall of the camera body, and slidable forwardly and backwardly in the direction of the optical axes of the lenses 212 and 214 for focusing purposes, focusing being accomplished by the usual focusing knob 220 mounted on the left side wall of the camera body. A focusing scale 222 on the side wall, graduated in terms of any suitable units of measurement (graduation in meters being here shown) cooperates with an index mark or reference point 220a on the knob. Film is wound by means of the conventional film winding crank 224 on the right hand side wall of the body. The objective shutter indicated in general at 18''' is cocked or tensioned by the operation of the film winding crank 224 in a manner well understood in the art, a typical example thereof being disclosed in Muller Patent 2,148,636, granted February 28, 1939. The shutter housing is of the conventional annular shape with an approximately cylindrical outer wall, and carries the photographic lens 212 in the threaded front lens tube. The exposure operation of the shutter is made by depressing a shutter release plunger 229 (FIG. 11) on the front wall of the camera body. The objective shutter housing 18''' contains the usual shutter blades, and the actuating and control mechanism for the shutter blades, and also the diaphragm leaves and the rotatable ring which controls the size of the iris diaphragm aperture. All of these parts thus far described are conventional and well known, and the detailed construction of such parts does not constitute part of the present invention.

In FIG. 12, the internal shutter speed control ring is indicated at 22''', and the internal diaphragm aperture control ring is indicated at 30f''', these two rings corresponding respectively to the rings 22 and 30 in the first embodiment illustrated in FIG. 2 of the present application. Again, as in the previous embodiments, the shutter speed ring and the diaphragm aperture ring are controlled by differential gearing which couples the rings together.

The differential gearing, in the present embodiment of the invention, comprises the two sun wheels 24''' and 30''', and a planet gear 38''' rotatable on a pivot pin or stub shaft 42''' which is mounted on the setting wheel or control ring 40'''. The control ring 40''' rotates concentrically with the optical axis, on a cylindrical external surface 18a''' of the shutter housing 18''', and this control ring itself has cylindrical outer bearing surfaces 40a''' (FIG. 9) on which the sun wheels 24''' and 30''' rotate, so that these members 40''', 24''', and 30''' all encircle the shutter housing and all rotate thereon concentrically with the optical axis of the shutter.

The sun wheel 24''' has a radially inwardly extending flange provided with internal gear teeth 24a''', while the sun wheel 30''' has a similar inwardly extending radial flange provided with gear teeth 30a''', both sets of gear teeth meshing with the gear teeth of the planet gear 38'''. As in the previous embodiments, the planet gear 38''' always lies tangential to an imaginary cylinder encircling and concentric with the optical axis. A radial arm on the shutter speed setting element 22''' engages a slot in the sun gear 24''' to couple the two members together for conjoint rotation. A radial arm on the diaphragm aperture setting member 30f''' engages a slot in the sun gear 30''' to couple these two members together for conjoint rotation. Both of these radial arms extend through arcuate circumferential slots in the shutter housing 18'''. For the sake of clarity, these radial arms are not shown in the drawings of this embodiment of the invention, but they are substantially the same as the respective radial arms 22a'' and 124a'' shown in FIG. 7 of the present drawings, in connection with a previously described embodiment of this invention.

In addition to the internal gear teeth 24a''' and 30a''', the respective sun gears 24''' and 30''' also have external gear teeth 24b''' and 30b''' on their peripheries, which external gear teeth mesh respectively with cooperating gear teeth on the peripheries of two graduated scale rings 238 and 240 which are arranged coaxially with each other and which rotate on the lens mount of the upper or finder lens 214. The scale rings 238 and 240 respectively carry the shutter speed scale 238a and 240a, both of which can be seen simultaneously through the observation window 242 in the top wall of the lens carrier 216, so as to be in convenient position for observation as the operator looks downwardly from above, as is done when using a twin lens reflex camera in the normal way.

There is a shutter speed setting knob 244 mounted on the member 216 for rotation about an axis parallel to the optical axis of the camera but offset laterally to one side of the common vertical plane containing both the optical axis of the picture taking lens and the optical axis of the finder lens, as seen particularly in FIG. 14. This shutter speed setting knob 244 which, through part of the circumference of the knob, projects laterally outside of the member 216, to an accessible position so that the knob can be turned by the finger of the operator. The knob also projects partly into the interior of the member 216, where the teeth of the knob engage and mesh with the gear teeth 24b''' on the sun gear 24''', so that any rotation imparted manually to the knob 244 is transmitted to the sun gear 24''' and to the shutter speed control cam member 22'''. There is preferably an arrester device or frictional brake device (not shown here, but similar to the spring loaded ball 134' in FIG. 5) engaging notches in one or another of the members 22''', 24''', and 244, to tend to retain this train of mechanism in any position in which it is set, until forcibly displaced therefrom.

On the opposite side of the camera from the shutter speed setting knob 244, is an exposure value setting knob 246, similarly projecting partially outside of the member 216 so as to be accessible for manual manipulation. Like the knob 244, the knob 246 also projects partly within the member 216, and has teeth on its periphery which mesh with external gear teeth 40b''' on the control ring 40''', which gear teeth project outwardly between the two sun gears 24''' and 30''', as seen especially in FIG. 12. Thus rotation of the exposure value setting knob 246 will rotate the control ring 40''', to carry the planet gear 38''' bodily with it.

An arresting device or resilient brake device, similar to the one above described in connection with the setting knob 244, engages the setting knob 246 to tend to hold it in the position in which it is set. Such an arresting device conveniently is in the form of a spring loaded ball 246a as seen in FIG. 12. The exposure value is adjusted by reference to an exposure value scale 246c (FIG. 11) read in conjunction with a fixed index mark or reference point 246b.

When selecting a desired pair of settings for shutter speed and diaphragm aperture, as for example by rotating the knob 244 while the knob 246 remains stationary, the shutter speed setting elements 22''' and 24''' will rotate (under the influence of the planet gear 38''') in the opposite direction from the rotation of the diaphragm aperture setting elements 30f''' and 30'''. If the scale rings 238 and 240 have their gear teeth meshing directly with the gear teeth of the sun gears 24''' and 30''', it follows that the two scale rings will likewise rotate in opposite directions during adjustment of the pairs of values. It is sometimes more convenient to the operator if the two scale rings move in the same direction, so that he can see some of the available pairs of values in proper relation to each other through the observation window 242. Therefore it is preferred that a reversing gear be inserted between one of the scale rings and its associated sun gear.

Figure 9:
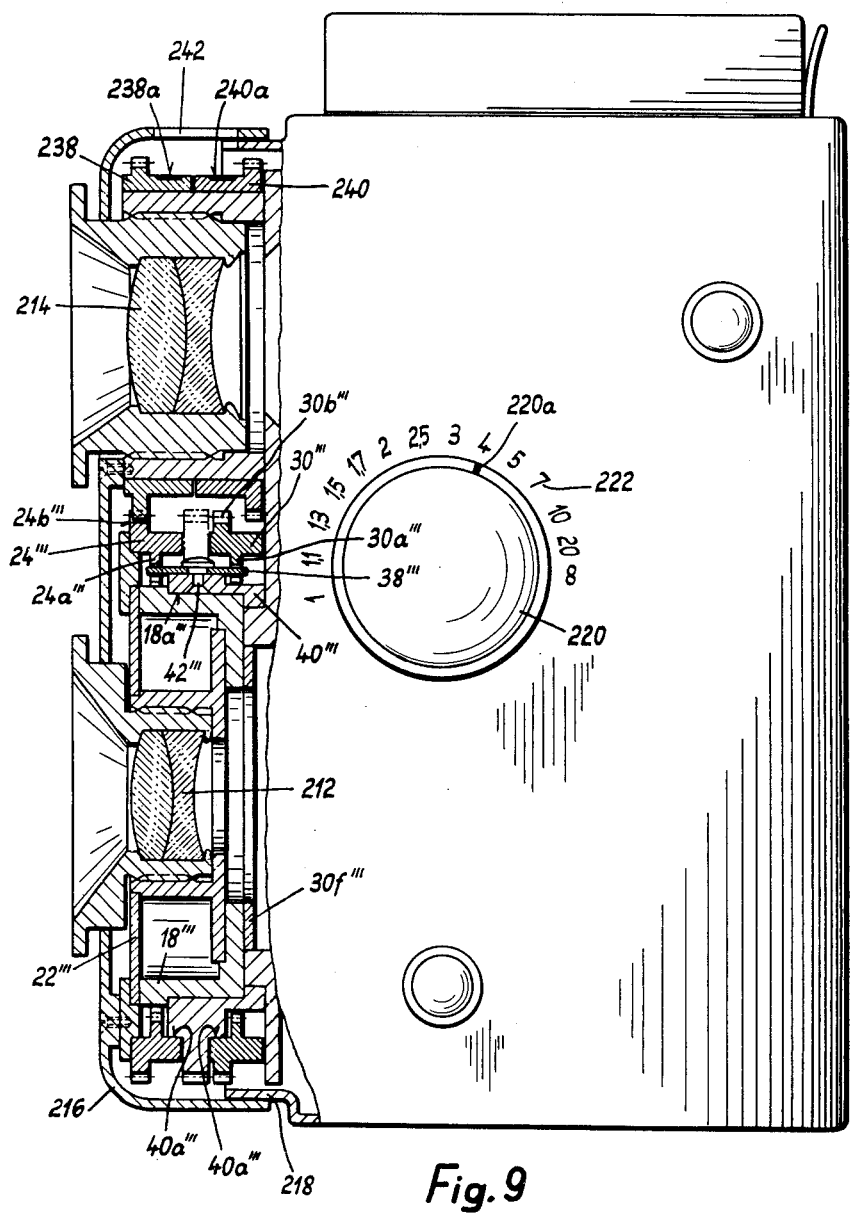
FIG. 9 is a side elevation, with parts broken away and parts in axial section, of another embodiment of the invention as applied to a twin lens reflex camera.

For example, the shutter speed scale ring 238 may mesh directly with the shutter speed sun gear 24'''. The gear teeth on the diaphragm aperture scale ring 240, however, are offset axially from the gear teeth on its associated sun gear 30''', as seen in FIG. 9, so that these gear teeth do not mesh directly with each other. There is a reversing gear 248 operatively interposed as indicated particularly in FIG. 14. The gear 248 is a pinion rotating on an axis parallel to the optical axis, the front end of the pinion meshing with the teeth 30b''' on the sun gear 30''', and the rear end of the pinion meshing with the teeth 240b on the scale ring 240, so that the scale ring rotates with, but in the opposite direction from, the sun gear 30'''.

With this arrangement, the two scale rings 238 and 240 will rotate in the same direction during adjustment of the shutter mechanism, even though the two sun gears 24''' and 30''' rotate in opposite directions. Because of the rotation of the scale rings in the same direction, the operator will be able to observe, in the window 242, various pairs of possible values of shutter speed and diaphragm aperture, in addition to the particular pair to which he has actually adjusted the camera. Thus, for example, when the parts are set as shown in FIG. 10, the operator will see that the camera is actually adjusted for an exposure of 1/15 of a second, at an aperture of f:5.6, but he will also see that adjacent coordinate possible pairs of values could be used, e.g., an exposure of 1/8 second at an aperture of f:8, or an exposure of 1/30 second at an aperture of f:4. All of these possible pairs represent the same exposure value, and any selected one of these possible pairs (together with other possibilities which do not show at the moment through the window 242, but which can be brought to a visible position beneath the window) can be set by turning the knob 244 while leaving the knob 246 stationary. As explained in connection with a previous embodiment, the resistance to turning the diaphragm aperture adjusting parts 30''' and 30f''' is less than the resistance to turning the control ring 40''' and knob 246, so that if the knob 244 is turned without forcibly turning the knob 246, the latter knob will remain stationary and the planet gear 38''' will simply rotate on its pivot without moving bodily, thereby turning the sun gear 30''' to the same extent as the turning of the sun gear 24''', but in the opposite direction.

The operation of this form of the invention will now be obvious from what has been said above, but may be briefly recapitulated as follows: The operator first opens the usual folding hood at the top of the camera body, above the usual ground glass focusing screen, and observes the object he desires to photograph, by means of the image thereof formed by light coming through the finder lens 214 and thence deflected upwardly to the focusing screen by the usual inclined mirror as customarily found in twin lens reflex cameras. When the image is clearly focused (by turning the focusing knob 220) the operator determines the proper exposure value, e.g., by reference to a built-in exposure meter mounted on the camera body, or a separate exposure meter held in the hand, or by estimation on the basis of his experience, and makes allowance, in determining the final exposure value, for other factors such as film speed, filter factor, etc. He then turns the setting knob 246 to bring the desired exposure value on the scale 246c opposite the index mark 246b. Through the differential gearing, this turning of the setting knob 246 automatically sets the shutter speed and diaphragm aperture to correlated values representing the particular exposure value desired by the operator. Because the resistance to changing the shutter speed is greater than the resistance to changing the diaphragm aperture, due to the spring pressed ball or other arresting device associated with the shutter speed train, the adjustment of the exposure value will ordinarily take place by changing the diaphragm aperture while leaving the shutter speed at its previous setting.

If the operator is not satisfied with the particular pair of values (shutter speed and diaphragm aperture) which are indicated as the actual setting, at the completion of manipulation of the knob 246, he may then manipulate the other knob 244 to change the shutter speed to any other desired value, and the diaphragm aperture will automatically be shifted correspondingly to compensate for the change in shutter speed.

In the embodiment described in connection with FIGS. 9–14, the setting knobs 244 and 246 rotate on axes which are parallel to the optical axis and symmetrically disposed in relation to the vertical plane containing both the optical axis of the finder lens and the optical axis of the picture taking lens. However, it is not essential for purposes of the present invention that the setting knobs be arranged in this manner, although it is the preferred arrangement. Other forms of arrangement of one or both of the setting knobs may be employed if the camera is of a somewhat different type, or if a different arrangement is needed for any special reason.

All of the embodiments described in connection with FIGS. 9–14 have in common the feature that the two sun gears and the control ring or wheel which carries the planet gear, are all arranged close to each other in a very compact form, and all rotate concentrically about the optical axis and encircle the shutter housing. Also, in all these forms the control ring or wheel which carries the planet gear has at least one peripheral segment which projects outwardly between the two sun gears and engages the means for adjusting the control ring. This arrangement permits the connection from the control knob or movable control member to be placed in any desired position of orientation with respect to the lens mount, and the operating connections can be extremely short. Also the parts can be built up of relatively simple and easily produced structural elements, such as spindles, gear wheels, setting knobs, and the like, and can be made rugged and durable even in a design of the utmost compactness. The shortness of the transmission train enables it to have a minimum of backlash and a maximum of precision in adjustment.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic shutter comprising an objective shutter housing of approximately circular annular form surrounding a central optical axis, a first sun gear member encircling said housing and rotatable with respect thereto about the optical axis as a center of rotation for adjusting shutter speed, a second sun gear member also encircling said housing and rotatable with respect thereto about the optical axis as a center of rotation for adjusting diaphragm aperture, a planet gear carrier member also encircling said housing and rotatable thereto about said optical axis as a center of rotation, a planet gear carried by said carrier member and meshing with both of said sun gear members, externally accessible manually operable means for turning said carrier member to move said planet gear bodily to cause rotary movement of at least one of said sun gear members, and other externally accessible manually operable means for turning one of said sun gear members without turning said carrier member, so that the turning of said one of said sun gear members will drive said planet gear to cause turning of the other of said sun gear members to an equal and opposite extent.

2. The combination with a photographic camera body, of an objective housing supported from said camera body, said housing having an optical axis, a shutter speed control member and a diaphragm aperture control member both mounted on said housing for rotation about said optical axis as a center, and a differential gear system operatively connecting said two control members to each other, said gear system including first gear tooth means operatively connected to said speed control member to rotate therewith about said optical axis as a center, second gear tooth means operatively connected to said aperture control member to rotate therewith about said optical axis as a center, said first and second gear tooth means constituting sun gears of a planetary differential gear system, a control ring encircling said housing and rotatable about said optical axis as a center, a planet gear carried by said control ring for rotation about a rotary axis substantially intersecting and perpendicular to said optical axis, said planet gear being between and meshing with both of said first and second gear tooth means so that rotation of either of said gear tooth means while said control ring is stationary will cause corresponding rotation in the opposite direction of the other of said gear tooth means, externally accessible manually operable means for rotating said control ring to carry said planet gear bodily therewith, and other externally accessible manually operable means for rotating one of said gear tooth means without rotation of said control ring.

3. A construction as defined in claim 2, in which said other externally accessible means is operatively connected primarily to that one of said gear tooth means which is connected to said speed control member and is connected to the other of said gear tooth means only through the medium of said planet gear.

4. A photographic shutter comprising an objective shutter housing of approximately circular annular form surrounding a central optical axis, a shutter speed control member and a diaphragm aperture control member both mounted on said housing for rotation about said optical axis as a center, a planet gear carrier member mounted on and encircling said shutter housing for rotation about said optical axis as a center of rotation, a planet gear mounted rotatably on said planet gear carrier member, a pair of sun gear rings each having internal gear teeth meshing with opposite sides of said planet gear, said sun gear rings encircling said planet gear carrier member and being mounted for rotation about said optical axis, means for coupling one of said sun gear rings with said shutter speed control member and the other of said sun gear rings with said diaphragm aperture control member for joint rotation therewith, externally accessible manually operable means for turning said carrier member to move said planet gear bodily to cause rotary movement of at least one of said sun gear rings, a shutter speed scale carried by said one sun gear ring, a diaphragm aperture scale carried by said other sun gear ring, and other externally accessible manually operable means for turning one of said sun gear rings without turning said carrier member, so that the turning of one of said sun gear rings will drive said sun gear rings to an equal and opposite extent.

5. The combination with a photographic camera body, of an objective housing supported from said camera body, said housing having an optical axis, a shutter speed control member and a diaphragm aperture control member both mounted on said housing for rotation about said optical axis as a center, and a differential gear system operatively connecting said two control members to each other, said gear system including a first gear ring operatively connected to said speed control member to rotate therewith about said optical axis as a center, a second gear ring operatively connected to said aperture control member to rotate therewith about said optical axis as a center, said first and second gear rings constituting sun gears of a planetary differential gear system, a carrier ring encircling said housing within said gear rings and rotatable about said optical axis as a center, a planet gear mounted on said carrier member for rotation about a rotary axis substantially intersecting and perpendicular to said optical axis, internal gear teeth on said gear rings meshing with opposite sides of said planet gear so that rotation of either of said gear rings while said carrier ring is stationary will cause corresponding rotation in the opposite direction of the other of said gear rings, a shutter speed scale and a diaphragm aperture scale each carried by one of said gear rings, externally accessible means for rotating said carrier ring to carry said planet gear bodily therewith to cause rotary movement of at least one of said gear rings, and other externally accessible manually operable means for rotating one of said gear rings without rotation of said carrier ring, said other externally accessible means being operatively connected primarily to that one of said gear rings which is connected to said speed control member and is connected to the other of said gear rings only through the medium of said planet gear.

References Cited in the file of this patent
FOREIGN PATENTS

| | | |
|---|---|---|
| 163,978 | Austria | Sept. 10, 1949 |
| 756,693 | Great Britain | Sept. 5, 1956 |
| 965,287 | Germany | June 6, 1957 |